United States Patent
Han et al.

(10) Patent No.: US 10,013,310 B2
(45) Date of Patent: Jul. 3, 2018

(54) CACHE MEMORY DEVICE AND OPERATING METHOD THEREOF

(71) Applicant: ELECTRONICS AND TELECOMMUNICATIONS RESEARCH INSTITUTE, Daejeon (KR)

(72) Inventors: Jin Ho Han, Seoul (KR); Young-Su Kwon, Daejeon (KR); Kyoung Seon Shin, Daejeon (KR); Kyung Jin Byun, Daejeon (KR); Nak Woong Eum, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 42 days.

(21) Appl. No.: 15/241,808

(22) Filed: Aug. 19, 2016

(65) Prior Publication Data
US 2017/0255520 A1    Sep. 7, 2017

(30) Foreign Application Priority Data
Mar. 2, 2016    (KR) .................. 10-2016-0025206

(51) Int. Cl.
| G06F 11/10 | (2006.01) |
| G06F 12/08 | (2016.01) |
| G06F 12/0804 | (2016.01) |
| G06F 12/0895 | (2016.01) |

(52) U.S. Cl.
CPC ...... *G06F 11/1076* (2013.01); *G06F 12/0804* (2013.01); *G06F 12/0895* (2013.01); *G06F 2212/1032* (2013.01)

(58) Field of Classification Search
CPC .. G06F 3/0619; G06F 11/073; G06F 11/1064; G06F 12/0895; G06F 11/1076; G06F 12/0808; G06F 12/0804; G06F 12/0897
See application file for complete search history.

(56) References Cited

U.S. PATENT DOCUMENTS

| 5,381,554 | A | * | 1/1995 | Langer ..................... G06F 1/26 307/38 |
| 6,591,335 | B1 | | 7/2003 | Sade et al. |
| 6,802,039 | B1 | * | 10/2004 | Quach .................. G06F 11/073 711/E12.017 |
| 7,328,391 | B2 | | 2/2008 | Hart et al. |
| 7,966,514 | B2 | | 6/2011 | Surasinghe |
| 8,051,247 | B1 | | 11/2011 | Favor et al. |

(Continued)

*Primary Examiner* — Shelly A Chase
(74) *Attorney, Agent, or Firm* — Rabin & Berdo, P.C.

(57) ABSTRACT

Provided is an operating method of a cache memory device includes receiving an address from an external device, reading an entry corresponding to at least a portion of the received address among a plurality of entries that are included in the cache memory, performing error detection on additional information that is included in the read entry, and performing a recovery operation on the entry based on a result of error detection and the additional information. The entry includes the additional information and a cache line corresponding to the additional information, and the additional information includes a tag, valid bit, and dirty bit that correspond to the cache line.

15 Claims, 8 Drawing Sheets

(56) References Cited

U.S. PATENT DOCUMENTS

| | | |
|---|---|---|
| 8,533,572 B2 | 9/2013 | Lu et al. |
| 8,589,763 B2 | 11/2013 | Fukuda |
| 9,348,681 B2 | 5/2016 | Han |
| 2010/0064206 A1* | 3/2010 | Moyer ................ G06F 11/1064 714/800 |
| 2012/0131356 A1 | 5/2012 | Han |
| 2015/0301884 A1* | 10/2015 | Ingalls ................ G06F 3/0619 714/807 |
| 2015/0309862 A1 | 10/2015 | Han et al. |

* cited by examiner

CACHE MEMORY DEVICE AND OPERATING METHOD THEREOF

CROSS-REFERENCE TO RELATED APPLICATIONS

This U.S. non-provisional patent application claims priority under 35 U.S.C. § 119 of Korean Patent Application No. 10-2016-0025206, filed on Mar. 2, 2016, the entire contents of which are hereby incorporated by reference.

BACKGROUND

The present disclosure herein relates to a cache memory, and more particularly, to a cache memory device and an operating method thereof.

A cache memory is a high-speed memory that is located between a processor and a system memory in order to supplement the operating speed between the processor and the system memory (e.g., SDRAM). The cache memory may temporarily store a command or data that is requested by the processor.

In the case where the command or data stored in the cache memory has an error by various factors, the processor may receive the command including the error from the cache memory and thus cause malfunction. Thus, various techniques for detecting or recovering the error that the cache memory has are being developed.

SUMMARY

The present disclosure provides a cache memory device that recovers an error in the case where a cache memory has an error or that informs whether an error has occurred, and an operating method thereof.

An embodiment of the inventive concept provides an operating method of a cache memory device includes receiving an address from an external device, reading an entry corresponding to at least a portion of the received address among a plurality of entries that are included in the cache memory, performing error detection on additional information that is included in the read entry, and performing a recovery operation on the entry based on a result of error detection and the additional information. The entry includes the additional information and a cache line corresponding to the additional information, and the additional information includes a tag, valid bit, and dirty bit that correspond to the cache line.

In example embodiments, the performing of error detection on the read additional information may include performing the error detection based on an error correction code (ECC) that corresponds to the read additional information.

In example embodiments, the performing of the recovery operation on the entry based on the result of error detection and the additional information may include performing at least one of a first operation of outputting an interrupt signal based on the result of error detection and the additional information, a second operation of recovering, from the system memory, the entry based on data that corresponds to the address, and a third operation of invalidating the entry.

In example embodiments, the valid bit may indicate information on whether the tag, the cache line, and the dirty bit are valid, the tag may indicate a portion of an address corresponding to the cache line, and the dirty bit may indicate a dirty state or clean state of the cache line.

In example embodiments, the cache memory device may vary in operating voltage according to control of the external device.

In example embodiments of the inventive concept, a cache memory device includes a storage region configured to store a tag, valid bit, dirty bit, and cache line, and a controller configured to access the storage region based on an address received from an external device. The controller performs error detection on the tag, the valid bit, the dirty bit, and the cache line based on an error correction code (ECC) that corresponds to the tag, the valid bit, the dirty bit, and the cache line, recovers the tag, the valid bit, the dirty bit, and the cache line based on a result of the error detection, the tag, the valid bit, and the dirty bit.

In example embodiments, the cache memory device may vary in operating voltage according to control of the external device.

In example embodiments, the controller may perform at least one of a first operation of outputting an interrupt signal based on the result of error detection and the tag, the valid bit, and the dirty bit, a second operation of recovering, from the system memory, the tag, the valid bit, the dirty bit, and the cache line based on data that corresponds to the address, and a third operation of invalidating the tag, the valid bit, the dirty bit, and the cache line.

In example embodiments, the controller may include an ECC circuit that performs the error detection.

In example embodiments, the controller may adjust a size of the storage region according to control of the external device.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
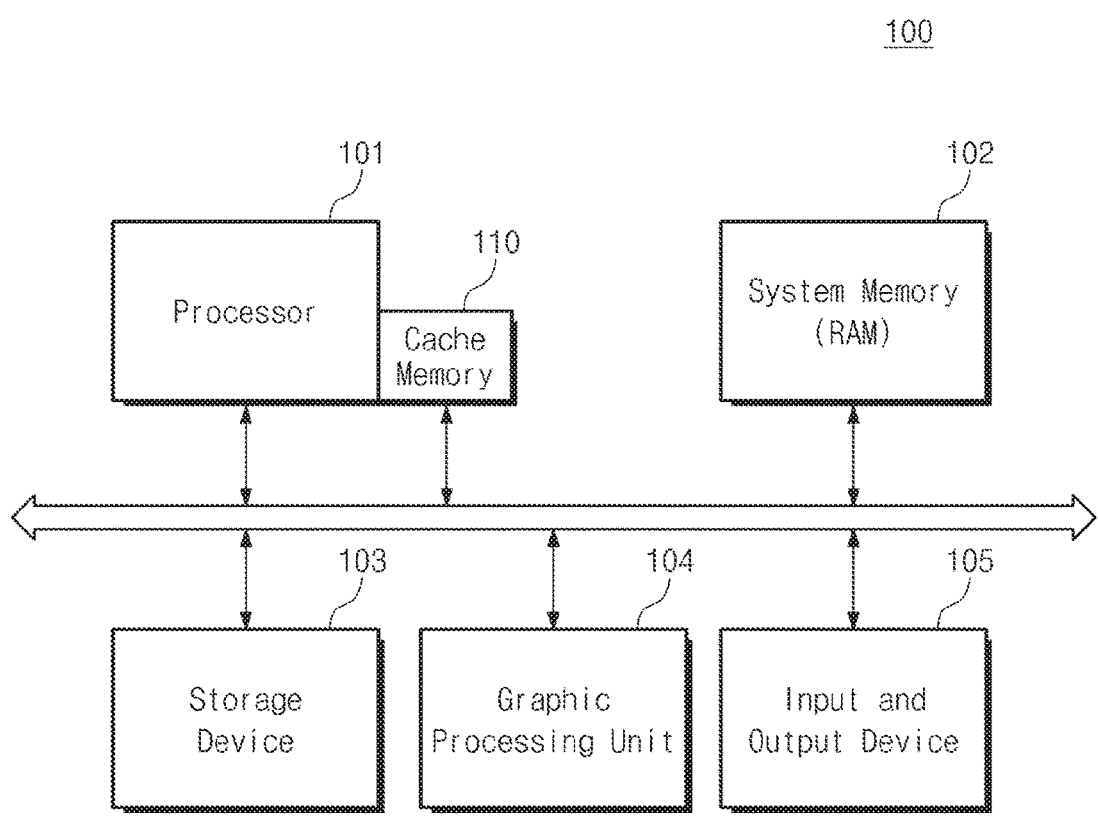
FIG. 1 is a block diagram that shows a user system according to an embodiment of the inventive concept.

In the following, embodiments of the inventive concept are described in detail with reference to the accompanying drawings. In the following description, details, such as detailed configurations and structures are provided in order to simply help the overall understanding of the embodiments of the inventive concept. Therefore, variations of the embodiments in the text may be performed by a person skilled in the art without departing from the technical spirit and scope of the inventive concept. Moreover, the descriptions of well-known functions and structures are omitted for clarity and conciseness. The terms used in the text are ones defined in consideration of the functions of the inventive concept and not limited to specific functions. The definition of the terms may be performed based on the matters set forth in the detailed description.

The modules in the drawings or in the detailed description may be connected to components other than those shown in the drawing or set forth in the detailed description. The connection between the modules or components may be direct or indirect. The connection between the modules or components may be performed by communication or be a physical connection.

FIG. 1 is a block diagram that shows a user system according to an embodiment of the inventive concept. Referring to FIG. 1, a user system 100 may include a processor 101, a cache memory 110, a system memory 102, a storage device 103, a graphic processing unit (GPU) 104, and an input and output device 105. As an example, the user system 100 may be a computing system, such as a desktop computer, notebook computer, server, workstation, portable communication terminal, personal digital assistant (PDA), portable media player (PMP), tablet PC or wearable device.

The processor 101 may control the overall operation of the user system 100. The processor 101 may perform various operations that are performed in the user system 100.

The system memory 102 may be a buffer memory of the user system 100. For example, the system memory 102 may temporarily store a portion of information or data that is stored in the storage device 103, and provide the temporarily stored information or data to the processor 101 or cache memory 110. As an example, the system memory 102 may include random access memories (RAM), such as a static RAM (SRAM), synchronous dynamic random access memory (SDRAM), double data rate SDRAM (DDR SDRAM), phase-change RAM (PRAM), magnetic RAM (MRAM), resistive RAM (RRAM), and ferroelectric RAM (FRAM). The system memory 102 may communicate directly with the processor 101 or cache memory 110 through a system bus.

The storage device 103 may be a mass storage medium that stores various pieces of data or information that are used in the user system 100. As an example, the storage device 103 may include a mass storage medium, such as a hard disk drive (HDD), a solid state drive (SSD), a memory stick, or a memory card.

The GPU 104 may perform a series of calculation operations for outputting image data related to the information or data that is processed in the user system 100. As an example, the GPU 104 may be mounted in the processor 101 in the form of a system on chip (SoC).

The input and output device 105 includes various devices that input data or commands to the user system 10 or output data to the outside. For example, the input and output device 105 may include user input devices, such as a keyboard, keypad, button, touch panel, touch screen, touch pad, touch ball, camera, microphone, gyroscope sensor, vibration sensor, piezoelectric element, temperature sensor, and biometric sensor, and user output devices, such as a liquid crystal display (LCD), an organic light-emitting diode (OLED) display device, an active matrix OLED (AMOLED) display device, LED, speaker and monitor.

As an example, the operating speed of the processor 101 is quicker than that of the system memory 102 or storage device 103. The cache memory 110 may provide a storage space or storage device which the processor 101 may quickly access. For example, the cache memory 110 may temporarily store a portion of the data or information that is stored in the system memory 102 or storage device 103 so that the processor 101 may quickly access data. As an example, the cache memory 110 may include an external cache memory, an internal cache memory, a disk cache memory, an L1 cache memory, an L2 cache memory or the like. Alternatively, the cache memory 110 may be a high-speed storage device, such as a register or SRAM.

As an example, the processor 101 may change an operating speed or operating voltage according to the operating condition of the user system 100. For example, in the case where the user system 100 operates in a low-power mode or in a low-performance mode, the processor 101 may decrease the operating clock frequency or the operating voltage to decrease the power required in the user system 100. In addition, the processor 101 may decrease the operating clock frequency or operating voltage provided to the cache memory 110 to decrease the power required in the user system 100.

As an example, in the case where the operating clock frequency or operating voltage provided to the cache memory 110 decreases, the data stored in the cache memory 110 may have a soft error. The cache memory 110 according to the inventive concept may detect and recover the soft error that occurs in a low-power mode. The cache memory 110 and the operating method thereof according to the inventive concept are described in more detail with reference to the following drawings.

Figure 2:
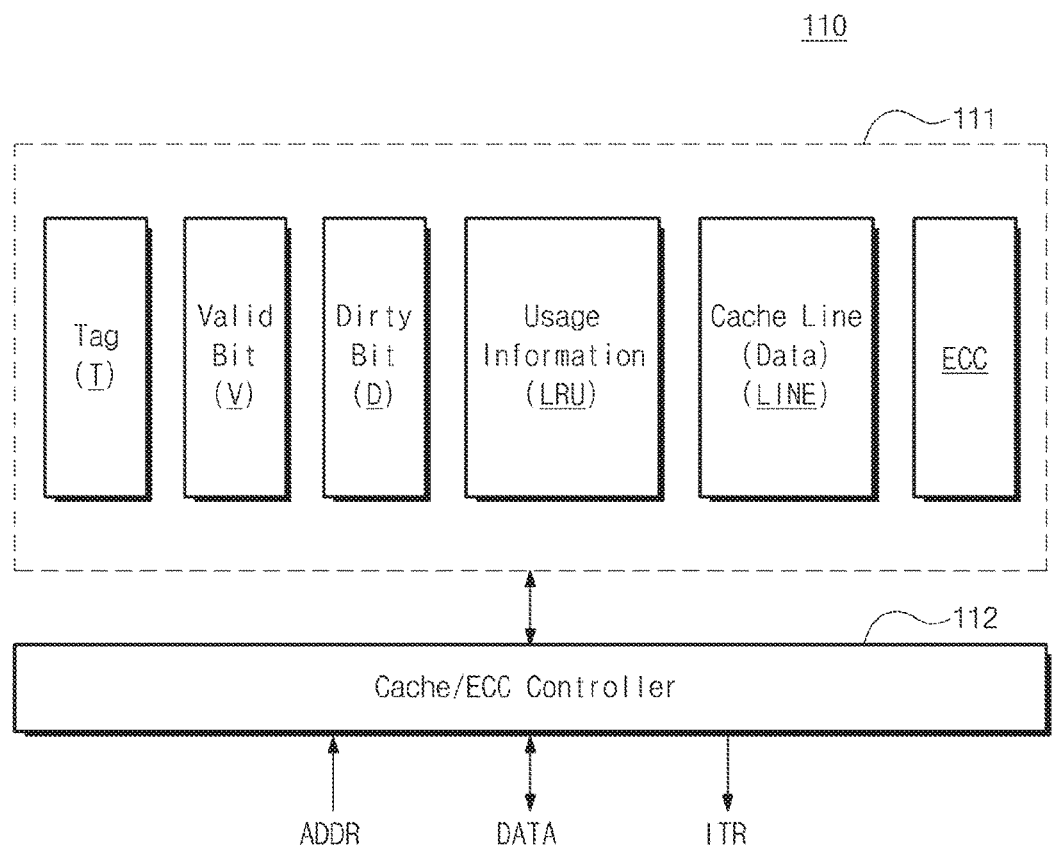
FIG. 2 is a detailed block diagram of a cache memory in FIG. 1.

FIG. 2 is a detailed block diagram of the cache memory in FIG. 1. Referring to FIGS. 1 and 2, the cache memory 110 includes a memory region 111 and a cache/ECC controller 112 (hereinafter, referred to as a "controller").

The memory region 111 includes a tag T, a valid bit V, a dirty bit D, usage information LRU, a cache line LINE, and an error correction code (ECC). The tag T indicates a portion of an address that corresponds to the cache line LINE stored in the memory region 111. The valid bit V indicates whether the information stored in the tag T and cache line LINE is valid.

The dirty bit D indicates whether information in the cache line LINE is written or updated by the processor 101. For example, information in the cache line LINE may be provided from the system memory 102 or a low-level cache memory (not shown). That is, the information in the cache line LINE may correspond to or be equal to a portion of information in the system memory 102 or a low-level cache memory (not shown). First data stored in the system memory 102 (as an example, the first data corresponds to a first address) may be stored in the cache line LINE of the cache memory 110 by a request from the processor 101. Then, the first data in the cache line LINE corresponding to the first address may be updated by a request from the processor 101. At this time, the data stored in the system memory 102 would be first data before an update, and first data after the update would be stored in the cache line LINE. In this case, by setting the dirty bit D, it is possible to show that the data stored in the cache line LINE has not been updated, not been reflected or not been flushed with the system memory 102 or a low-level cache (not shown).

The usage information LRU includes information on the number of times that the processor 101 has accessed the cache line LINE selected with reference to a specific address, or on usage frequency of the selected cache line.

The cache line LINE indicates data having a certain unit. As an example, the cache line LINE may have data in units of 32 bits or data in units of 32 bytes.

As an example, the storage region 111 may include a plurality of tags T, a plurality of valid bits V, a plurality of dirty bits D, a plurality of pieces of usage information LRU, and a plurality of cache lines LINE. Each of the plurality of cache lines LINE may correspond to any one of the plurality of tags T, any one of the plurality of valid bits V, any one of the plurality of dirty bits D, and any one of the plurality of pieces of usage information LRU. As an example, some of the plurality of cache lines LINE, some of the plurality of tags T, some of the plurality of valid bits V, some of the plurality of dirty bits D, and some of the plurality of pieces of usage information LRU may correspond to a portion of specific addresses. In other words, some of the plurality of cache lines LINE, some of the plurality of tags T, some of the plurality of valid bits V, some of the plurality of dirty bits D, and some of the plurality of pieces of usage information LRU may be output by a specific address. For a concise description, some of the plurality of cache lines LINE, some of the plurality of tags T, some of the plurality of valid bits V, some of the plurality of dirty bits D, and some of the plurality of pieces of usage information LRU that are output by one specific address are referred to as one entry. That is, one entry may be accessed by any one specific address.

The ECC may be one for additional information, such as the tag T, valid bit V, dirty bit D, or usage information LRU stored in the storage region 111 or data in the cache line LINE. As an example, one ECC may correspond to one entry. However, the scope of the inventive concept is not limited thereto and the ECC may correspond to the additional information (i.e., tag T, valid bit V, dirty bit D or usage information LRU) and the cache line LINE, respectively. As an example, when the additional information and the cache line LINE are stored in the storage region 111, the controller 112 may generate the ECC and write the generated ECC together into the storage region 111.

The controller 112 may receive an address ADDR from the processor 101 and access the storage region 111 in response to the received address ADDR. The controller 112 may send and receive data DATA to and from the processor 101. For example, the controller 112 may receive an address ADDR from the processor 101 and receive, from the storage region 111, additional information and a cache line LINE that correspond to the received address ADDR. The controller 112 may output data in a corresponding cache line LINE of read cache lines LINE or write data into the corresponding cache line LINE, based on a portion of the received address ADDR and the additional information.

As an example, the controller 112 may use the ECC to detect and correct errors in additional information and data in the cache line LINE. The controller 112 may receive an address ADDR from the processor 101, and read, from the storage region 111, an entry corresponding to the received address ADDR (i.e., some of the plurality of cache lines LINE, some of the plurality of tags T, some of the plurality of valid bits V, some of the plurality of dirty bits D, and some of the plurality of pieces of usage information LRU. The controller 112 may use an ECC corresponding to the read entry to detect and correct errors in additional information and a cache line LINE that are included in the read entry. As an example, the controller 112 may include an ECC circuit for performing error detection.

As an example, the controller 112 may perform error recovery on information stored in the storage region 111 based on a result of error detection and additional information. As an example, in the case where as the result of error detection by the controller 112, an error is included in the valid bit V, the controller 111 may determine whether the dirty bit D in the read additional information is "0". In the case where the dirty bit D is "0", the controller 111 may invalidate information on the corresponding entry (i.e., additional information and data in cache line LINE), read corresponding data from the system memory 102, and write the read data into the invalidated cache line LINE. At his point, it is possible to write additional information (i.e., tag T, valid bit V, dirty bit D, and usage information LRU) associated with the read data together into the corresponding entry. As an example, in the case where the dirty bit D is "1", errors of the data stored in a corresponding cache line LINE would be uncorrectable. In this case, the controller 112 may output an interrupt signal ITR. As an example, the processor 101 may perform separate error correction for recovering data stored in a cache line LINE in response to the interrupt signal. As an example, the separate error correction may be performed in a software layer.

As an example, the controller 112 may be located outside the cache memory 110. For example, the controller 112 may be located in the processor 110, and the storage region 111 may be a separate memory circuit which is located outside the processor 110. Alternatively, the controller 112 and the storage region 111 may be embedded in the processor 110.

As an example, the configuration or structure of the cache memory 110 or the operation of the controller 112 as described above is an example for easily describing the technical feature of the inventive concept, and the technical spirit of the inventive concept is not limited thereto. The cache memory 110 and the operating method thereof according to an embodiment of the inventive concept are described in more detail with reference to the following drawings.

Figure 3:
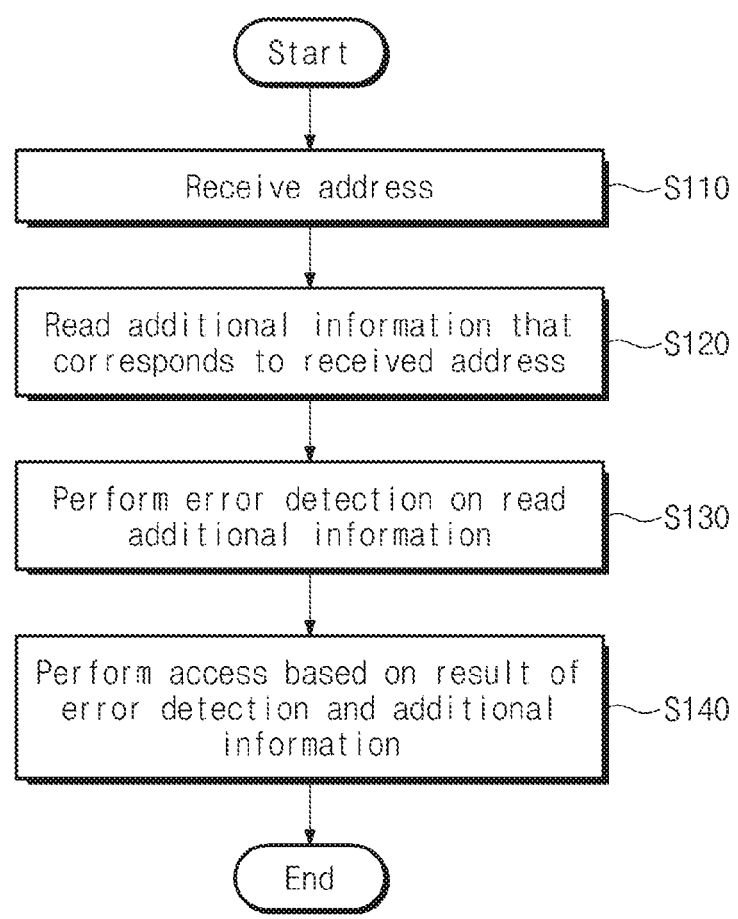
FIG. 3 is a flow chart that shows an operation of the cache memory in FIG. 2.

FIG. 3 is a flow chart that shows the operation of the cache memory in FIG. 2. Referring to FIGS. 2 and 3, in step S110, the cache memory 110 may receive an address ADDR. For example, the cache memory 110 may receive the address ADDR from the processor 101.

In step S120, the cache memory 110 may read additional information corresponding to the received address ADDR. For example, the cache memory 110 may read an entry corresponding to a portion of the received address ADDR. As described earlier, the entry may include additional information and a cache line LINE that correspond to one address ADDR. That is, the cache memory 110 may read a tag T, a valid bit V, a dirty bit D, usage information LRU, and a cache line LINE that correspond to a portion of the received address ADDR.

In step S130, the cache memory 110 may perform error detection on the read additional information. For example, as described with reference to FIG. 2, the cache memory 110 may include an ECC for additional information and a cache line LINE. The cache memory 110 may perform error detection on the read additional information based on the ECC.

In step S140, the cache memory 110 may perform an access operation based on a result of error detection and additional information. For example, in the case where the result of error detection indicates an error in valid bit V and all the dirty bits D are "0", the cache memory 110 may invalidate the additional information and the cache line LINE in the read entry and recover data corresponding to the invalidated entry from the system memory 102. In addition, the cache memory 110 may classify error cases according to a result of error detection and additional information, and perform a proper recovery or access operation according to the classified error cases.

According to embodiments of the inventive concept as described above, the cache memory 110 may perform error detection based on an ECC for additional information, such as a tag T, a valid bit V, a dirty bit D, and usage information LRU. At this point, the cache memory 110 may perform different access operations according to a result of error detection and additional information.

Thus, it is possible to efficiently manage a soft error that the cache memory has. Thus, a cache memory device having enhanced reliability, and an operating method thereof are provided.

Figure 4:
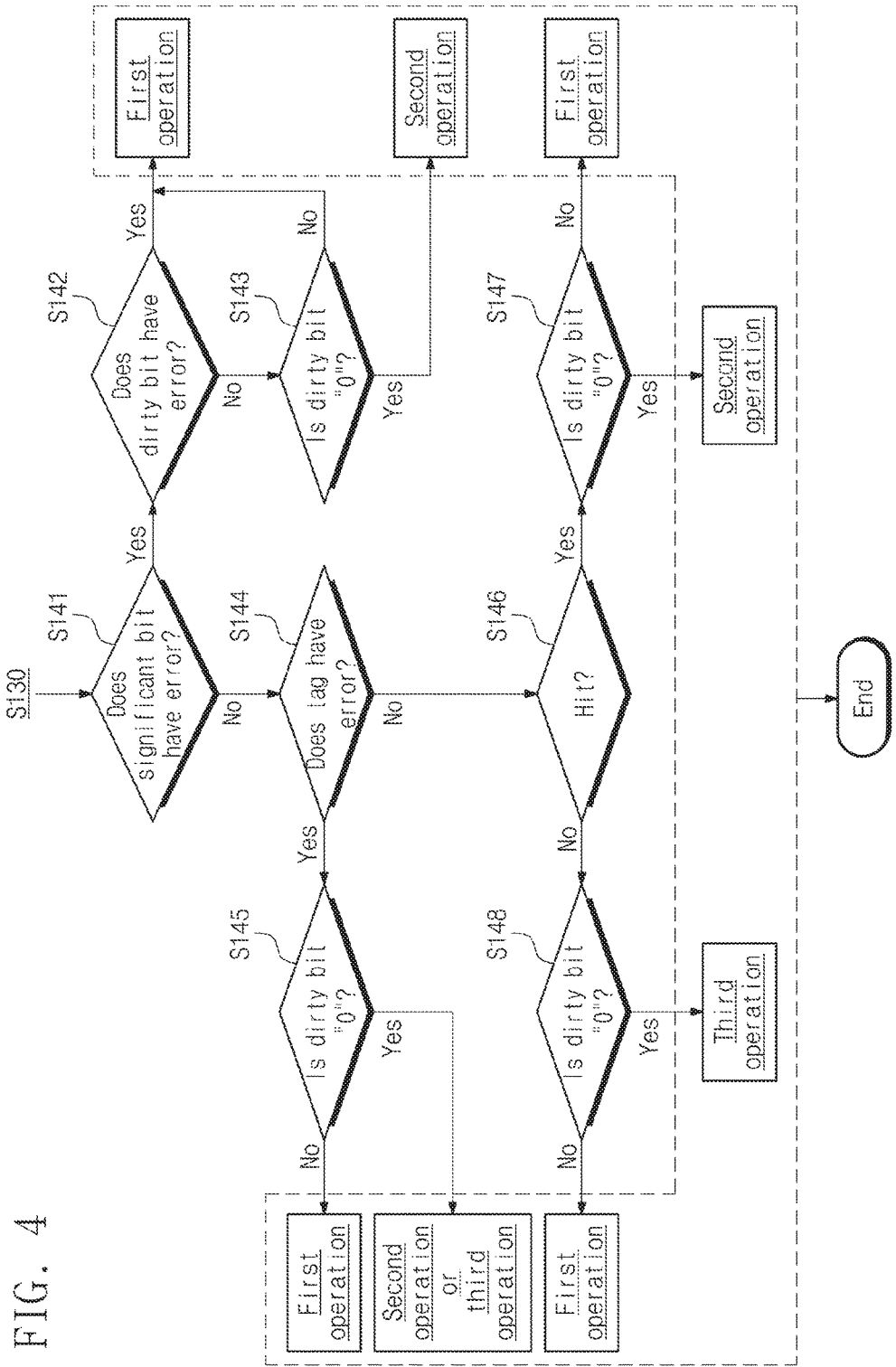
FIG. 4 is a detailed flow chart of step S140 in FIG. 3.

FIG. 4 is a detailed flow chart of step S140 in FIG. 3. For a simplified description, it is assumed that the value "0" in the dirty bit D indicates that data in the cache line LINE is clean status, and the value "1" indicates that data in the cache line LINE is dirty status. Also, it is assumed that additional information, such as a valid bit V, a dirty bit D, and a tag T to be described with reference to FIG. 4 is additional information that is included in one entry corresponding to one address ADDR. However, it is only to clearly describe embodiments of the inventive concept, and the scope of the inventive concept is not limited thereto.

Also, for a concise description, it is assumed that a first operation indicates outputting an interrupt ITR signal, a second operation indicates invalidating a corresponding entry and recovering the invalidated entry from the system memory 102, and a third operation indicates invalidating a corresponding entry. As an example, in the second operation, recovering the invalidated entry from the system memory 102 may include reading corresponding data from the system memory 102 and writing the read data into the invalidated entry. However, the scope of the inventive concept is not limited thereto.

Referring to FIGS. 2 and 4, the cache memory 110 may perform operations in steps S141 to S148. As an example, the operations in steps S141 to S148 may be a series of operations that classify error cases based on a result of error detection and additional information. As an example, the operations in steps S141 to S148 may be performed in parallel, at the same time or sequentially. As an example, the operations in steps S141 to S148 may be performed by the controller 112 that has been described with reference to FIG. 2. Alternatively, the operations in steps S141 to S148 may be implemented in a separate hardware circuit and operate according to the control of the controller 112.

First, in step S141, the cache memory 110 may determine whether an error is included in a valid bit V. In the case where as a result of determination, it is determined that the error is included in the valid bit V, the cache memory 110 performs an operation in step S142.

In step S142, the cache memory 110 may determine whether an error is included in a dirty bit D. In the case where as a result of determination in step S142, the error is detected from the dirty bit D, the cache memory 110 may perform the first operation. That is, since it is difficult to ensure the reliability of data in a cache line LINE in the case where the valid bit V has an error and the dirty bit D has an error, the cache memory 110 may output an interrupt signal ITR. As an example, the processor 101 may receive the interrupt signal ITR and perform separate error correction in response to the received signal. As an example, the interrupt signal ITR may be provided to a separate error correction circuit (not shown), and the separate error correction circuit (not shown) may perform error correction in response to the interrupt signal ITR.

In the case where an error is not detected from the dirty bit D, it is possible to determine whether the dirty bit D is "0" in step S143. In the case where the dirty bit D is "0", the cache memory 110 may perform the second operation. In the case where the dirty bit D is not "0", the cache memory 110 may perform the first operation. As described earlier, the second operation indicates invalidating a corresponding entry and recovering the invalidated entry from the system memory 102. That is, in the case where an error is detected from the valid bit V, the dirty bit D has no error, and all the dirty bits D are "0", the cache memory 110 may perform the second operation to recover data and information stored in an entry.

In the case where a result of determination in step S141 indicates that the valid bit V has no error, the cache memory 110 may determine whether the tag T has an error in step S144. In the case where an error is included in the tag T, the cache memory 110 may determine whether the dirty bit D is "0", in step S145. In the case where the dirty bit D is not "0", the cache memory 110 may perform the first operation. That is, in the case where the valid bit V has no error, an error is included in the tag T, and the dirty bit D is not "0", the cache memory 110 may perform the first operation.

In the case where it is determined by determination in step S145 that the dirty bit D is "0", the cache memory 110 may perform the second or third operation. As an example, the cache memory 110 may perform the second operation on additional information and data that correspond to a cache hit tag in an entry, and perform the third operation on additional information and data that correspond to a cache miss tag in an entry. As an example, the third operation indicates only invalidating additional information and data.

In the case where it is determined by determination in step S144 that an error is not detected from the tag T, the cache memory 110 may determine whether it is a cache hit, in step S146. For example, the cache memory 110 may compare a portion of a received address ADDR with a tag T included in an entry to determine whether it is the cache hit.

In the case of the cache hit, the cache memory 110 may determine whether the dirty bit D is "0", in step S147. In the case where the dirty bit D is "0", the cache memory 110 may perform the second operation, and in the case where the dirty bit D is not "0", the cache memory 110 may perform the first operation.

In the case of the cache miss, the cache memory 110 may determine whether the dirty bit D is "0" in step S148, and in the case where the dirty bit D is "0", the cache memory 110 may perform the third operation, and in the case where the dirty bit D is not "0", the cache memory 110 may perform the first operation.

As an example, the first, second or third operation after steps S147 and S148 may be performed only when an error is detected from a cache line LINE.

Table 1 shows error case classification and error management methods according to the flow chart in FIG. 4.

TABLE 1

|  | Valid Bit (V) | Tag (T) | Dirty Bit | Cache Line | Error management |
|---|---|---|---|---|---|
| First Error Case | Error | — | All 0s | — | Second Operation (Invalidation and Recovery from System Memory) |
| Second Error Case | Error | — | Not All 0s or Error | — | First Operation (Interrupt Signal Output) |
| Third Error Case | No Error | Error (Hit Way) | 0 | — | Second Operation (Invalidation and Recovery from System Memory) |
| Fourth Error Case | No Error | Error (Hit Way) | 1 | — | First Operation (Interrupt Signal Output) |

TABLE 1-continued

| | Valid Bit (V) | Tag (T) | Dirty Bit | Cache Line | Error management |
|---|---|---|---|---|---|
| Fifth Error Case | No Error | Error (Miss Way) | 0 | — | Third Operation |
| Sixth Error Case | No Error | Error (Miss Way) | 1 | — | First Operation (Interrupt Signal Output) |
| Seventh Error Case | No Error | Hit | 0 | Error | Second Operation (Invalidation and Recovery from System Memory) |
| Eighth Error Case | No Error | Hit | 1 | Error | First Operation (Interrupt Signal Output) |
| Ninth Error Case | No Error | Miss | 0 | Error | Third Operation (Invalidation) |
| Tenth Error Case | No Error | Miss | 1 | Error | First Operation (Interrupt Signal Output) |

Referring to Table 1, a first error case indicates when an error is detected from the valid bit V and all the dirty bits D are "0". In the case where the first error case occurs, the cache memory 110 may perform the second operation (i.e., entry invalidation and entry recovery from a system memory). For example, in the case where an error is detected from the valid bit V, it is difficult to determine the validity of additional information and a cache line LINE in a read entry, but in the case where all the dirty bits D are "0", the same data as that of the cache line LINE of the read entry would be stored in the system memory 102. In this case, the cache line LINE of the read entry may be recovered from the system memory 102 through the second operation.

A second error case indicates when an error is detected from the valid bit V and not all the dirty bits D are "0" or an error is detected from the dirty bit D. In the case where the second error case occurs, the cache memory 110 may perform the first operation (i.e., interrupt signal output). For example, in the case where an error is detected from the valid bit V, it is difficult to determine the validity of additional information and a cache line LINE in a read entry, and in the case where the dirty bit has an error or not all the dirty bits D are "0" (i.e., at least one of the dirty bits is "1"), it is difficult to determine whether data stored in the cache line LINE of the read entry is the same as corresponding data in the system memory 102. In this case, since it is difficult to recover an error in cache line LINE of the read entry, it is possible to output an interrupt signal.

A third error case indicates when an error is not detected from the valid bit V, an error is detected from a hit tag T, and the dirty bit D is "0". In the case where the third error case occurs, the cache memory 110 may perform the second operation. For example, in the case where an error is detected from the hit tag T and the dirty bit D is "0", data in a cache line LINE may be recovered through the second operation because the data in a cache line LINE corresponding to the hit tag T is the same as data in the system memory 102.

A fourth error case indicates when an error is not detected from the valid bit V, an error is detected from the hit tag T, and the dirty bit D is "1". In the case where the fourth error case occurs, the cache memory 110 may perform the first operation. For example, in the case where an error is detected from the hit tag T and the dirty bit D is "1", it is difficult to recover data in a cache line LINE because the data in a cache line LINE corresponding to the hit tag T is not the same as data in the system memory 102. In this case, the controller 110 may output an interrupt signal ITR.

A fifth error case indicates when an error is not detected from the valid bit V, an error is detected from a miss tag T, and the dirty bit D is "0". In the case where the fifth error case occurs, the cache memory 110 may perform the third operation. As an example, since a cache line LINE corresponding to the miss tag T is not data access-requested by the processor 101, a separate recovery operation is not required. Thus, only simple invalidation may be performed in the fifth error case.

Likewise, a sixth error case indicates when an error is not detected from the valid bit V, an error is detected from the miss tag T, and the dirty bit D is "1". In the case where the sixth error case occurs, the cache memory 110 may perform the first operation.

A seventh error case indicates when an error is not detected from the valid bit V, an error is not detected from the hit tag T, the dirty bit D is "0", and an error is detected from the cache line LINE. In the case where the seventh error case occurs, the cache memory 110 may perform the second operation.

An eighth error case indicates when an error is not detected from the valid bit V, an error is not detected from the hit tag T, the dirty bit D is "1", and an error is detected from the cache line LINE. In the case where the eighth error case occurs, the cache memory 110 may perform the first operation.

A ninth error case indicates when an error is not detected from the valid bit V, an error is not detected from the miss tag T, the dirty bit D is "0", and an error is detected from the cache line LINE. In the case where the seventh error case occurs, the cache memory 110 may perform the third operation.

A tenth error case indicates when an error is not detected from the valid bit V, an error is not detected from the miss tag T, the dirty bit D is "1", and an error is detected from the cache line LINE. In the case where the tenth error case occurs, the cache memory 110 may perform the first operation.

As described above, the cache memory 110 (or the controller 112) according to the inventive concept may perform error detection on additional information and data stored in the cache memory 110 based on the ECC, and perform recovery operation on data in the cache memory 110 based on a result of error detection and additional information. Thus, a cache memory that may prevent a soft error according to operating voltage or operating frequency regulation and has enhanced reliability, and an operating method thereof are provided.

Figure 5:
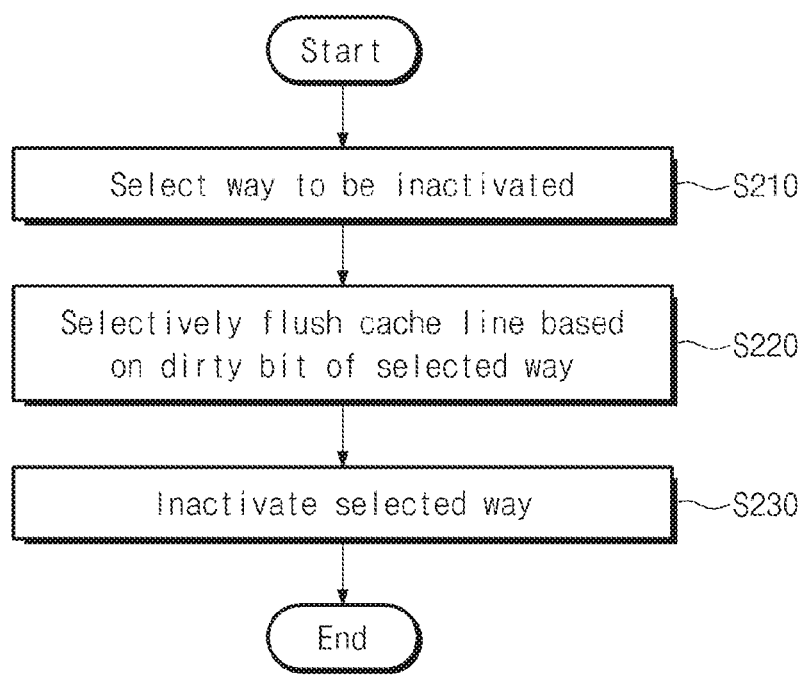
FIG. 5 is a flow chart that shows another operation of the cache memory in FIG. 1.
Figure 6:
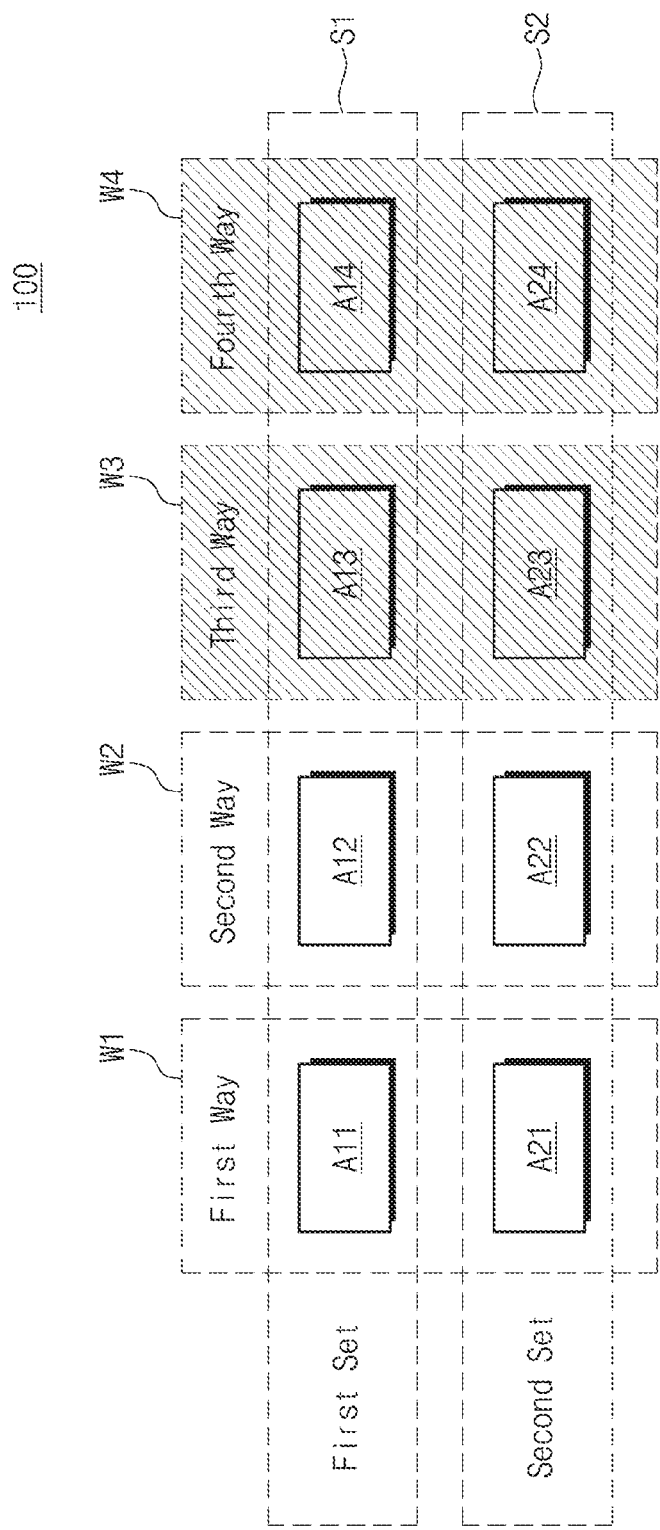
FIG. 6 is a diagram for explaining the operating method of FIG. 5.

FIG. 5 is a flow chart that shows another operation of the cache memory in FIG. 1. FIG. 6 is a diagram for explaining the operating method of FIG. 5. As an example, as described earlier, decreasing the operating voltage of the user system 100 or the processor 101 is to decrease general power consumption. That is, by decreasing the operating voltage or operating frequency provided to the cache memory 110, general power consumption may decrease. Furthermore, by adjusting the usage space of the cache memory 110 according to the operating method of the cache memory 110 to be described with reference to the following drawings, it is possible to further decrease power consumption.

Referring to FIGS. 1, 2 and 5, in step S210, the cache memory 110 may select a way to be inactivated. For example, the cache memory 110 may include first to fourth ways W1 to W4 as shown in FIG. 6. The first to fourth ways W1 to W4 may include a plurality of storage spaces A11 to A14 and A21 to A24, respectively. As an example, each of the plurality of storage spaces A11 to A14 and A21 to A24 indicates a certain storage space that stores the additional information and cache line LINE as described earlier. The plurality of storage spaces A11 to A14 and A21 to A24 may be divided into first and second sets S1 and S2, respectively. For example, a first storage space A11 may be included in a first way W1 and in the first set S1. Likewise, a second storage space A22 may be included in a second way W2 and in the second set S2. That is, the plurality of storage spaces A11 to A14 and A21 to A24 may be divided into a plurality of ways and a plurality of sets. The cache memory 110 may select a way to be inactivated in response to the control of the processor 101, to a request from an application executed on the processor 101, or to a separate control signal from the processor 101. For example, the third and fourth ways W3 and W4 may be selected as ways to be inactivated.

In step S220, the cache memory 110 may selectively flush data in a cache line LINE of a way to be inactivated to the system memory, with reference to a dirty bit D of the selected way. For example, the selected ways are ones that are not used by a request from the processor 101 or an application and data would not be stored in the selected ways.

As described earlier, the dirty bit D indicates whether the data stored in the cache line LINE matches the data stored in the system memory 102. That is, in the case where the dirty bit D is "1" (i.e., in a dirty state), the cache memory 110 may flush data in a corresponding cache line LINE to the system memory 102, and in the case where the dirty bit is "0", the cache memory 110 may invalidate the corresponding cache line LINE. As an example, the cache memory 110 may perform the error recovery operation described with reference to FIGS. 1 to 4 together with the operation in step S220.

In step S230, the cache memory 110 may inactivate the selected way. As an example, since in step S220, all the dirty state data among pieces of data in the selected way has been flushed to the system memory 102, the processor 101 may normally access data.

Figure 7:
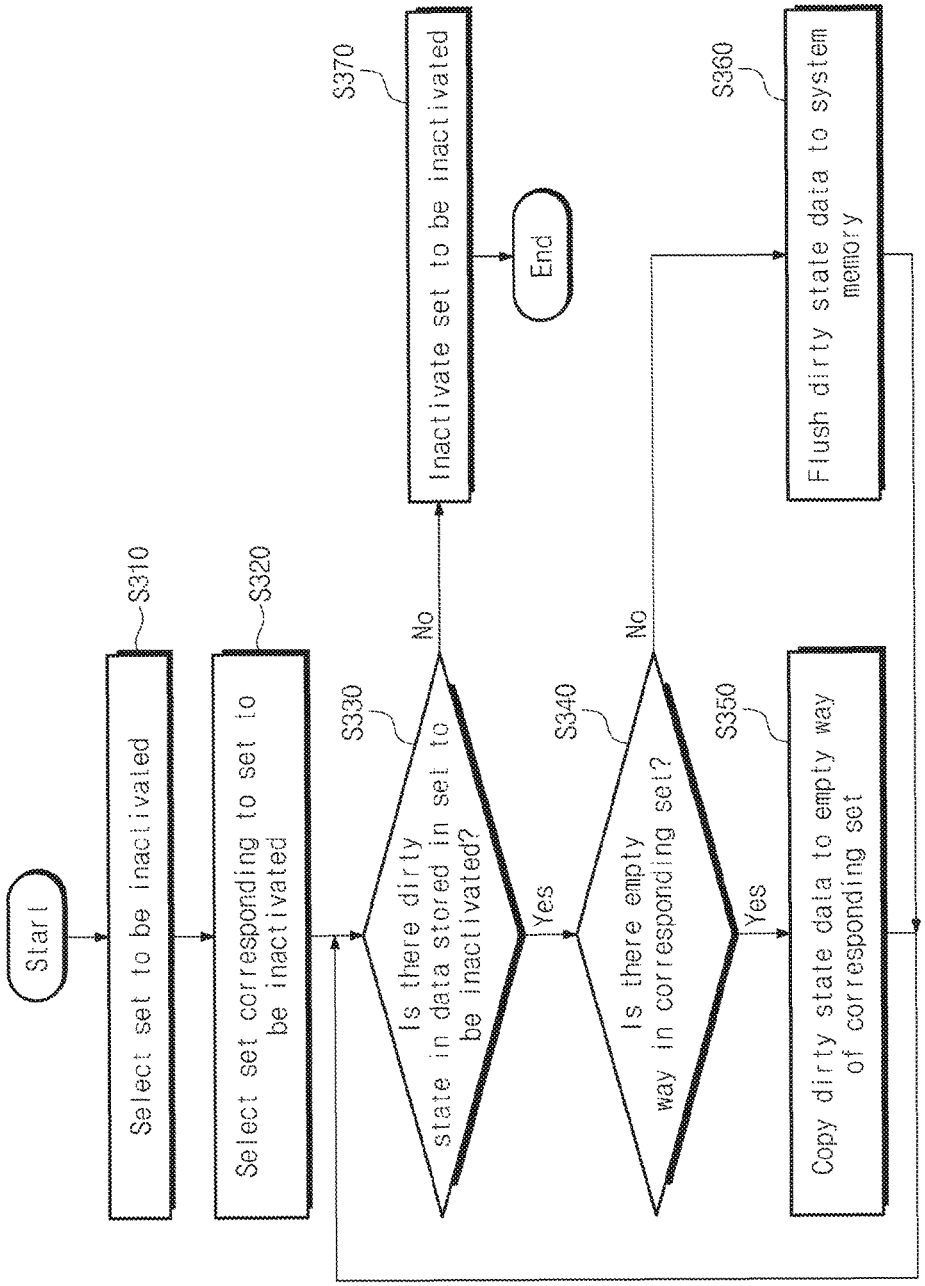
FIG. 7 is a flow chart that shows another operating method of the cache memory in FIG. 2.
Figure 8:
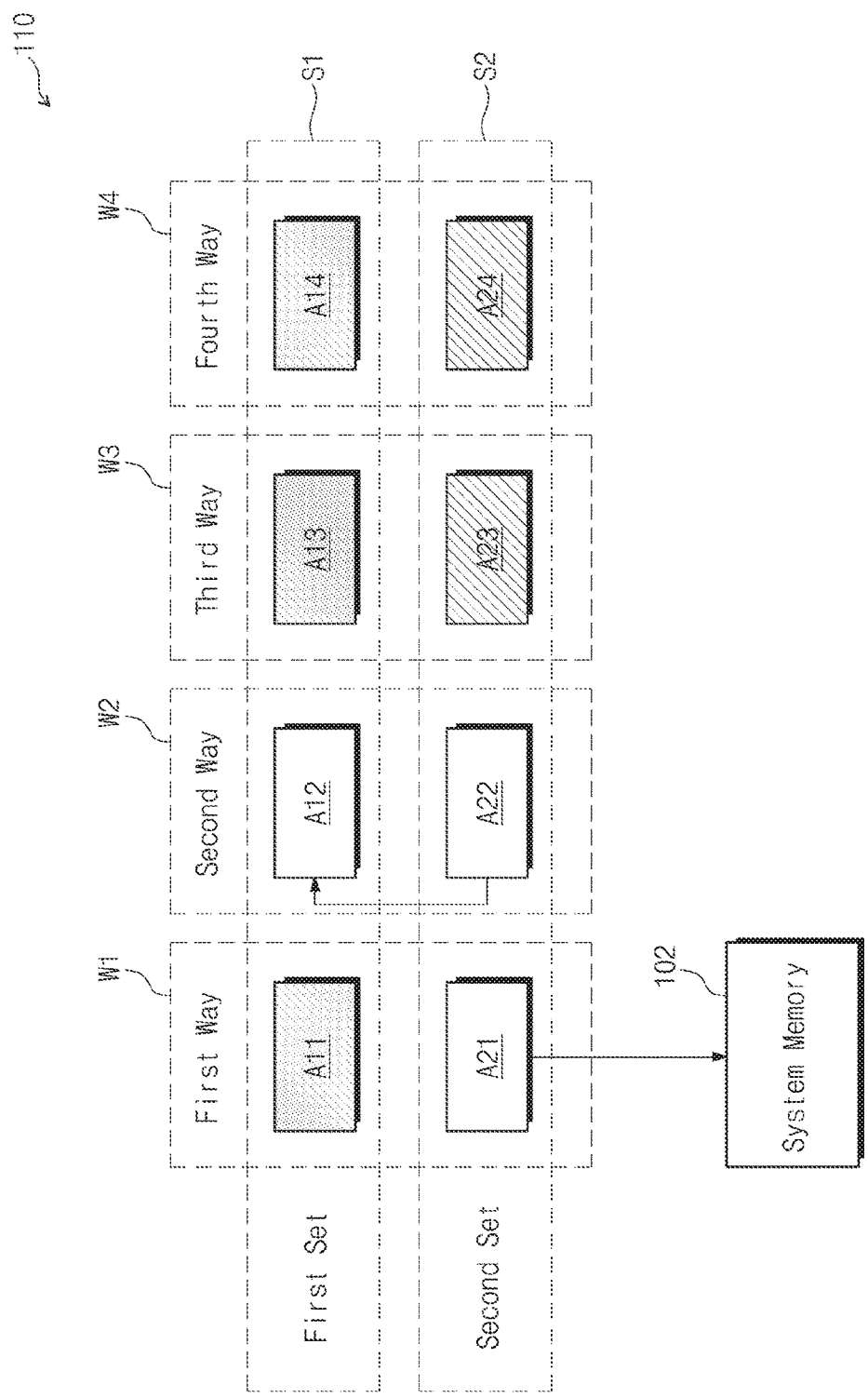
FIG. 8 is a diagram for explaining the operating method according to the flow chart of FIG. 7.

FIG. 7 is a flow chart that shows another operating method of the cache memory in FIG. 2. FIG. 8 is a diagram for explaining the operating method according to the flow chart of FIG. 7. Referring to FIGS. 7 and 8, in step S310, the cache memory 110 may select a set to be inactivated. For example, as described earlier, the cache memory 110 may include first to fourth ways W1 to W4. The first to fourth ways W1 to W4 may include a plurality of storage spaces A11 to A14 and A21 to A24, respectively. As an example, each of the plurality of storage spaces A11 to A14 and A21 to A24 indicates a certain storage space that stores the additional information and cache line LINE as described earlier. The plurality of storage spaces A11 to A14 and A21 to A24 may be divided into first and second sets S1 and S2, respectively.

The cache memory 110 may select a set to be inactivated according to a request from the processor 101 or an application. For example, the second set S2 may be selected as a set to be inactivated.

In step S320, the cache memory 110 may select a set corresponding to the set to be inactivated. For example, the set for the cache memory 110 may be selected based on a portion (e.g., index) of the address ADDR received from the processor 101. The index may include certain bits. The cache memory 110 may select a set having an index equal to at least some bits in an index corresponding to the set to be inactivated, as a corresponding set. As a more detailed example, in the case where the index of the set to be inactivated is "10011", a set having "00011" may be selected as a corresponding set. That is, a set having an index that remaining bits excluding the most valid bit are equal may be selected as a corresponding set.

In step S330, the cache memory 110 may determine whether there is dirty state data in the data stored in the set to be inactivated. For example, the cache memory 110 may search for dirty bits of the set to be inactivated to determine the state of the data stored in the set to be inactivated.

In the case where there is the dirty state data, the cache memory 110 may determine whether there is an empty way in a corresponding set, in step S340. As an example, the "empty way" indicates a way that corresponds to an invalidated storage space or a storage space in which data has not been stored, among storage spaces that are included in a corresponding set. In the case where there is the empty way, the cache memory 110 may copy a dirty state data to the empty way of a corresponding set in step S350. In the case where there is no empty way in a corresponding set, the cache memory 110 may flush the dirty state data to the system memory 102 in step S360.

For example, the second set S2 may be a set to be inactivated and the first set S1 may be a corresponding set as shown in FIG. 8. At this point, the storage regions A11, A13, and A14 included in the first, third and fourth ways W1, W3, and W4 among the storage regions A11 to A14 of the first set S1 may be storage regions that store valid data, and the storage region A12 included in the second way W2 may be an empty storage region. In this case, the second way W2 would be an empty way.

The storage regions A21 and A22 included in the first and second ways W1 and W2, respectively, among the storage regions A21 to A24 of the second set S2 may include dirty state data, and the storage regions, A23 and A24 included in the third and fourth ways W3 and W4, respectively may be clean state data.

As described earlier, since there is the empty way (i.e., second way W2) in the first set S1, dirty data in the second set S2 (e.g., data stored in the storage region A22 of the second way W2 of the second set S2) may be copied to the empty way of the first set S1 (or the storage region A12).

As an example, after dirty data has been copied to the storage region A12, there may be no empty way in the first set S1 (i.e., a corresponding set). In this case, remaining dirty data (i.e., data stored in the storage region A21) may be flushed to the system memory 102.

After the operations in steps S350 and S360, the cache memory 110 may perform the operation in step S330. In the case where a result of determination in step S330 indicates that there is o dirty state data, the cache memory 110 may inactive the set to be inactivated in step S370.

As an example, the inactivated set would not be accessed by the processor 101 or an application.

As an example, the cache memory 110 may inactive some of the plurality of sets to decrease power consumption. As an example, an activated set may have a number corresponding to power of 2. For example, the cache memory 110 may include 16 sets. The cache memory 110 may select 8, 12, 14 or 15 as the number of sets to be inactivated. In other words, the number of activated sets would be 8, 4, 2 or 1. That is, the number of activated sets would have a number corresponding to power of 2.

This may be caused by decreasing the number of bits of an index (i.e., a portion of an address ADDR) for searching for a set when a set is inactivated. For example, an index would include a plurality of binary bits. In the case where some of sets are inactivated, it is possible to select at least one of remaining activated sets based on some bits (e.g., a valid bit) among bits included in an index. In this case, since the activated sets should correspond to a binary index, the activated sets may have a number corresponding to power of 2. However, the scope of the inventive concept is not limited thereto.

As an example, in the case where a soft error excessively occurs in the error recovery operation described with reference to FIGS. 1 to 4, a cache capacity adjustment technique described with reference to FIGS. 5 to 8 may be applied. That is, the cache memory according to the inventive concept may adjust a cache capacity to inactivate an unnecessarily used cache region, so a soft error may decrease.

As described above, the cache memory according to the inventive concept may recover a soft error that may occur in the case where an operation voltage or operating frequency decreases, based on additional information and a result of error detection related to additional information. Also, the cache memory according to the inventive concept may dynamically adjust a storage space according to an external request. Thus, a cache memory device that has enhanced reliability and decreases power consumption, and an operating method thereof are provided.

The inventive concept provides a cache memory device having enhanced reliability, and an operating method thereof.

Although particular embodiments have been described in the detailed description of the inventive concept, many variations may be implemented without departing from the scope of the inventive concept. Therefore, the scope of the inventive concept should not be limited to the above-described embodiments and would be defined by equivalents to the claims of the inventive concept as well as the following claims.

What is claimed is:

1. An operating method of a cache memory device comprising:
   receiving an address from an external device;
   reading an entry corresponding to at least a portion of the received address among a plurality of entries that are included in the cache memory, the entry including
      a cache line, and
      additional information comprises a tag, a valid bit, and a dirty bit that correspond to the cache line;
   performing error detection on the additional information that is included in the read entry, to thereby determine whether the additional information contains an error; and
   performing a recovery operation on the entry based on a result of error detection and the additional information.

2. The operating method of claim 1, wherein the performing of error detection on the read additional information comprises performing the error detection based on an error correction code (ECC) that corresponds to the read additional information.

3. The operating method of claim 1, wherein the performing of the recovery operation on the entry based on the result of error detection and the additional information comprises
   performing at least one of a first operation of outputting an interrupt signal based on the result of error detection and the additional information, a second operation of recovering, from the system memory, the entry based on data that corresponds to the address, and a third operation of invalidating the entry.

4. The operating method of claim 3, wherein the performing of the at least one of the first to third operations comprises performing the second operation in a case where an error is detected from the valid bit and the dirty bit indicates a clean state.

5. The operating method of claim 3, wherein the performing of the at least one of the first to third operations comprises performing the first operation in a case where an error is detected from the valid bit, at least a portion of the dirty bit indicates a dirty state, or an error is detected from the dirty bit.

6. The operating method of claim 3, wherein the performing of the at least one of the first to third operations comprises performing the first operation in a case where an error is not detected from the valid bit, an error is detected from the tag, and the dirty bit indicates a dirty state.

7. The operating method of claim 3, wherein the performing of the at least one of the first to third operations comprises performing the second operation in a case where an error is not detected from the valid bit, the tag matches at least a portion of the address, an error is detected from the tag, and the dirty bit indicates a clean state.

8. The operating method of claim 3, wherein the performing of the at least one of the first to third operations comprises performing the third operation in a case where an error is not detected from the valid bit, the tag does not match at least a portion of the address, an error is detected from the tag, and the dirty bit indicates a clean state.

9. The operating method of claim 1, wherein the valid bit indicates information on whether the tag, the cache line, and the dirty bit are valid, the tag indicates a portion of an address corresponding to the cache line, and the dirty bit indicates a dirty state or clean state of the cache line.

10. An operating method of a cache memory device, comprising:
    receiving an address from an external device;
    reading an entry corresponding to at least a portion of the received address among a plurality of entries that are included in the cache memory;
    performing error detection on additional information that is included in the read entry; and
    performing a recovery operation on the entry based on a result of error detection and the additional information,
    wherein the entry comprises the additional information and a cache line corresponding to the additional information, and the additional information comprises a tag, a valid bit, and a dirty bit that correspond to the cache line, and
    wherein the cache memory device varies in operating voltage according to control of the external device.

11. A cache memory device comprising:
    a storage region configured to store
       a cache line, and
       additional information including a tag, a valid bit, a dirty bit that correspond to the cache line; and
    a controller configured to access the storage region based on an address received from an external device, the controller being configured to
       perform error detection on the additional information and the cache line based on an error correction code (ECC) that corresponds to the additional information and the cache line, to thereby determine whether the additional information and the cache line contain an error and
       recover the tag, the valid bit, the dirty bit, and the cache line based on a result of the error detection and the additional information.

12. The cache memory device of claim 11, wherein the cache memory device varies in operating voltage according to control of the external device.

13. The cache memory device of claim 11, wherein the controller performs at least one of a first operation of outputting an interrupt signal based on the result of error detection and the tag, the valid bit, and the dirty bit, a second operation of recovering, from the system memory, the tag, the valid bit, the dirty bit, and the cache line based on data that corresponds to the address, and a third operation of invalidating the tag, the valid bit, the dirty bit, and the cache line.

14. The cache memory device of claim 11, wherein the controller comprises an ECC circuit that performs the error detection.

15. The cache memory device of claim 11, wherein the controller adjusts a size of the storage region according to control of the external device.

* * * * *